(12) United States Patent
McNellis et al.

(10) Patent No.: US 8,821,727 B2
(45) Date of Patent: Sep. 2, 2014

(54) SYSTEMS AND METHODS FOR TREATING WASTEWATER

(75) Inventors: John Maurice McNellis, Manhattan, KS (US); Brian Scott Thiemann, Wheaton, KS (US); Robin Dale Mahan, Manhattan, KS (US); Jeri Louis Meyer, St. George, KS (US); Todd Lee Steinbach, Manhattan, KS (US)

(73) Assignee: Aero-Mod Incorporated, Manhattan, KS (US)

( * ) Notice: Subject to any disclaimer, the term of this patent is extended or adjusted under 35 U.S.C. 154(b) by 416 days.

(21) Appl. No.: 13/222,853

(22) Filed: Aug. 31, 2011

(65) Prior Publication Data
US 2012/0312753 A1 Dec. 13, 2012

Related U.S. Application Data

(60) Provisional application No. 61/494,571, filed on Jun. 8, 2011.

(51) Int. Cl.
*C02F 1/74* (2006.01)
*C02F 3/30* (2006.01)

(52) U.S. Cl.
CPC .......... *C02F 1/74* (2013.01); *C02F 2209/005* (2013.01); *C02F 2209/222* (2013.01); *C02F 3/30* (2013.01); *Y10S 210/903* (2013.01)
USPC ........... 210/605; 210/614; 210/630; 210/143; 210/198.1; 210/259; 210/903

(58) Field of Classification Search
CPC ................... C02F 2209/005; C02F 2209/006; C02F 2209/22; C02F 2209/225; C02F 3/301; C02F 1/74

USPC ................. 210/605, 614, 621, 623, 630, 143, 210/198.1, 252, 259, 903, 906
See application file for complete search history.

(56) References Cited

U.S. PATENT DOCUMENTS 4,655,925 A 4/1987 Tabata et al.
5,035,795 A 7/1991 Schmid
(Continued)

OTHER PUBLICATIONS

PCT/US2011/49999 International Search Report and Written Opinion dated Jan. 17, 2012 (9 pages).
(Continued)

*Primary Examiner* — Fred Prince
(74) *Attorney, Agent, or Firm* — Michael Best & Friedrich LLP

(57) ABSTRACT

A wastewater treatment system includes one or more aeration tanks for receiving wastewater, a controller for controlling the amount of air delivered to each of the one or more aeration tanks by a blower assembly, and a sensor assembly for periodically measuring values corresponding to the amount of dissolved oxygen in at least one of the one or more aeration tanks. When the sensor assembly measures values that are less than a low setpoint value, the controller causes the blower assembly to incrementally deliver more air until the sensor assembly measures values that are not less than the low setpoint value. When the sensor assembly measures values that exceed the low setpoint value, the controller causes the blower assembly to incrementally deliver less air until either the sensor assembly measures values that are not greater than the low setpoint value, or the blower assembly reaches a preselected low operating threshold. When the blower assembly is operating at the preselected low operating threshold, and the sensor assembly measures values that exceed a high setpoint value for a first designated period of time, the controller causes the blower assembly to shut down for a second designated period of time.

21 Claims, 7 Drawing Sheets

(56) References Cited

U.S. PATENT DOCUMENTS

| | | | |
|---|---|---|---|
| 5,076,928 A | 12/1991 | Ballnus | |
| 5,137,636 A | 8/1992 | Bungaard | |
| 5,196,111 A | 3/1993 | Nicol et al. | |
| 5,228,996 A | 7/1993 | Landsdell | |
| 5,421,383 A | 6/1995 | Schmid | |
| 5,490,934 A | 2/1996 | Schmid | |
| 5,536,407 A | 7/1996 | Petersen | |
| 5,611,927 A | 3/1997 | Schmid | |
| 6,123,846 A * | 9/2000 | Kikuchi | 210/614 |
| 6,165,359 A * | 12/2000 | Drewery | 210/195.1 |
| 7,172,699 B1 * | 2/2007 | Trivedi et al. | 210/605 |
| 7,416,669 B1 * | 8/2008 | Carolan et al. | 210/614 |
| 2004/0112829 A1 | 6/2004 | Jenkins et al. | |
| 2008/0087602 A1 * | 4/2008 | Kuzma | 210/605 |
| 2008/0283455 A1 * | 11/2008 | McKinney | 210/96.1 |
| 2009/0230055 A1 | 9/2009 | Jenkins et al. | |

OTHER PUBLICATIONS

Converti et al., "Biological removal of phosphorus from wastewaters by alternating aerobic and anaerobic conditions," Water Research, Jan. 1, 1995, pp. 263-269, vol. 29, No. 1.

European Office Action from the European Patent Office for Application No. 97904172.0 dated Mar. 27, 2001 (4 pages).

European Search Report from the European Patent Office for Application No. 97904172.0 dated Oct. 10, 1999 (3 pages).

PCT/US1997/01647 International Search Report dated Apr. 22, 1997 (4 pages).

PCT/US1997/01647 International Preliminary Examination Report dated Jan. 29, 1998 (4 pages).

Office Action from the Mexican Patent Office for Application No. 986990 dated Apr. 10, 2002 (Translation, 2 pages).

* cited by examiner

SYSTEMS AND METHODS FOR TREATING WASTEWATER

CROSS-REFERENCE TO RELATED APPLICATIONS

This application claims priority to U.S. Provisional Application No. 61/494,571, filed Jun. 8, 2011, the content of which is incorporated herein by reference in its entirety.

BACKGROUND OF THE INVENTION

The treatment of wastewater requires the removal of organic and inorganic contaminants present in solid and/or dissolved form. Organic contaminants include proteins, lipids and polysaccharides as well as hazardous compounds such as aromatic and aliphatic hydrocarbons. Nitrogen-based and phosphorus-based compounds, which have been recognized as major contributors to eutrophication, also need to be removed during the treatment process.

Biological wastewater treatment systems generally use a variety of microorganisms for efficient and complete biodegradation of contaminating compounds. The organic charge in the wastewater is often measured by biochemical oxygen demand (BOD), which defines the overall oxygen load that a wastewater will impose on receiving water. During biological wastewater treatment, organic substances, and some nitrogen-based and phosphorus-based compounds are consumed by microorganisms as essential nutrients to support microbial growth during assimilatory processes. Excess amounts of nitrogen-based compounds also are removed during dissimilatory microbial nitrogen metabolism, during which they are transformed to molecular nitrogen and released into the atmosphere. Specifically, the microbial consortia within the wastewater treatment system first converts ammonia to nitrate (nitirification) under oxic conditions, and then convert the nitrate to molecular nitrogen (denitrification) under anoxic conditions. Excess phosphorus-based compounds may be removed under by the "luxury phosphorus uptake" process where some microbes within the wastewater treatment system accumulate phosphorus and store it as poly-phosphorus compounds, thus removing it from the system during sludge disposal.

Biological wastewater treatment systems capable of removing nitrogen and phosphorus generally include alternating anoxic and oxic environments, such as alternating tanks or zones configured to receive different amounts of air (i.e., oxygen) via blowers. The effectiveness of such systems depends on the ability to control the amount of dissolved oxygen within each environment, while still providing for adequate biomass growth, maintenance of different microbial species, effective solid-liquid separation, sludge stabilization, and proper optimization and control of environmental conditions in the multiple zones of the treatment system. Existing systems have attempted to achieve the best conditions for nitrogen removal, but generally introduce too much dissolved oxygen into the various zones (thereby inhibiting denitirification and phosphorous removal), and often require substantial amounts of energy, mechanical equipment and/or physical space.

SUMMARY OF THE INVENTION

This disclosure provides systems and methods for treating wastewater. In some embodiments, the wastewater treatment system may include a first aeration tank for receiving wastewater, a second aeration tank for receiving wastewater from the first aeration tank, and a controller for controlling the amount of air delivered to the first and second aeration tanks by a blower assembly. The controller may operate in a plurality of modes including a first mode that causes the blower assembly to deliver air to the first aeration tank but not to the second aeration tank, and a second mode that causes the blower assembly to deliver air to the second aeration tank but not to the first aeration tank.

In some embodiments, the wastewater treatment system may include one or more aeration tanks for receiving wastewater, a controller for controlling the amount of air delivered to each of the one or more aeration tanks by a blower assembly, and a sensor assembly for periodically measuring values corresponding to the amount of dissolved oxygen in at least one of the one or more aeration tanks. When the sensor assembly measures values that are less than a low setpoint value, the controller may cause the blower assembly to incrementally deliver more air until the sensor assembly measures values that are not less than the low setpoint value. When the sensor assembly measures values that exceed the low setpoint value, the controller may cause the blower assembly to incrementally deliver less air until either the sensor assembly measures values that are not greater than the low setpoint value, or the blower assembly reaches a preselected low operating threshold. When the blower assembly is operating at the preselected low operating threshold, and the sensor assembly measures values that exceed a high setpoint value for a first designated period of time, the controller may cause the blower assembly to shut down for a second designated period of time.

In some embodiments, the method of treating wastewater may include receiving wastewater in a first aeration tank, receiving wastewater in a second aeration tank from the first aeration tank, aerating the wastewater in the first aeration tank while aerating the wastewater in the second aeration tank, and aerating the wastewater in the second aeration tank while not aerating the wastewater in the first aeration tank.

In some embodiments, the method of treating wastewater may include receiving an influent of wastewater, and aerating the wastewater while measuring the amount of dissolved oxygen in the wastewater. When the measured amount of dissolved oxygen in the wastewater is less than a designated lower limit, the method may include incrementally increasing the amount of aeration until the amount of dissolved oxygen in the wastewater is not less than the lower limit. When the measured amount of dissolved oxygen in the wastewater is greater than the lower limit, the method may include incrementally decreasing the amount of aeration until either the amount of dissolved oxygen in the wastewater is not greater than the lower limit or a designated low aerating threshold has been reached. When the designated low aerating threshold has been reached, and the measured amount of dissolved oxygen in the wastewater is greater than a designated upper limit for a first designated period of time, the method may include terminating aerating for a designated period of time.

Other aspects of the inventions disclosed herein will become apparent by consideration of the detailed description, the drawings and the claims.

DETAILED DESCRIPTION

Figure 1:
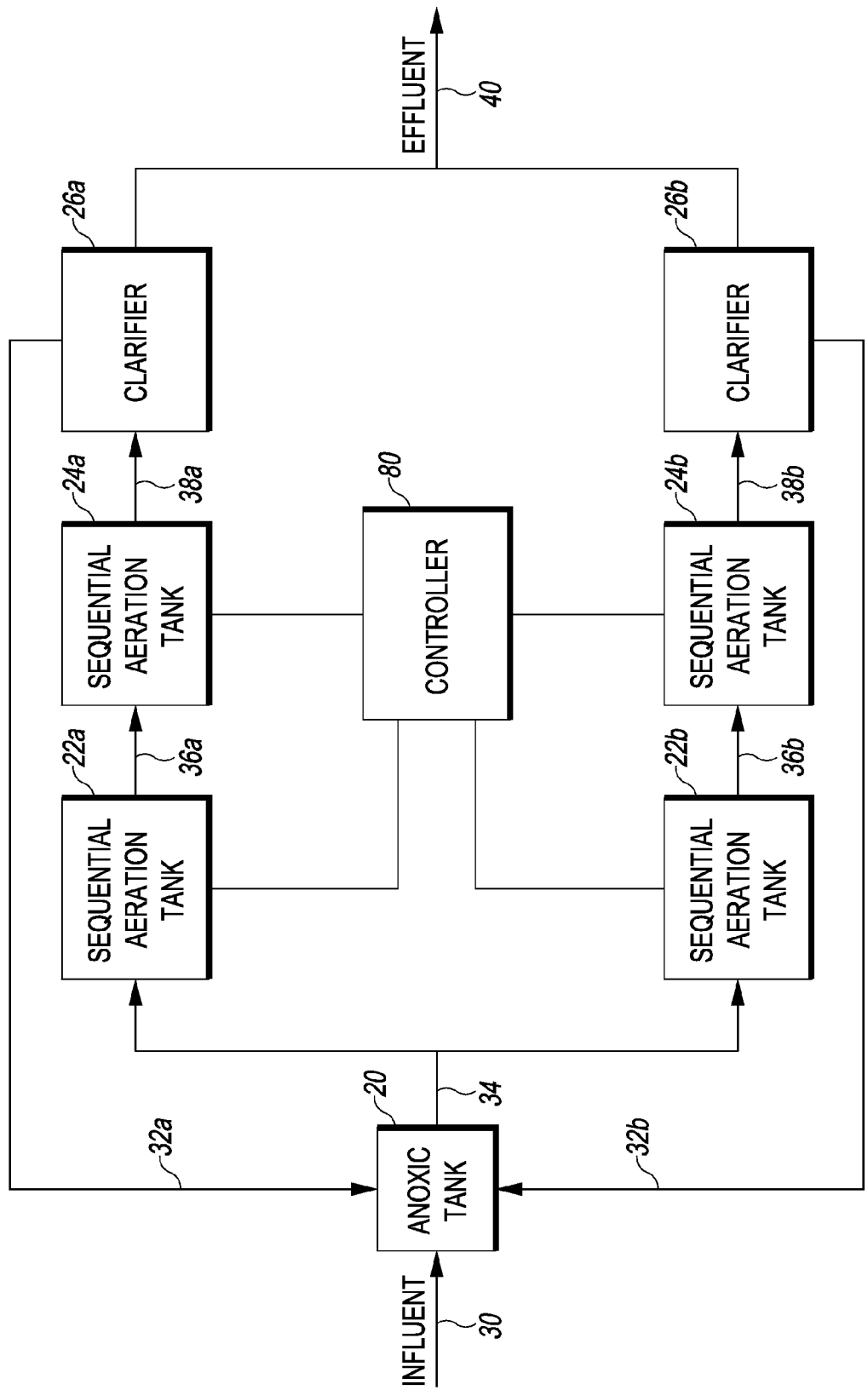
FIG. 1 is a schematic block diagram illustrating the flow of wastewater through an exemplary wastewater treatment system, according to aspects of this disclosure.

This disclosure provides systems and methods for treating wastewater that efficiently remove nitrogen-based and phosphorous-based nutrients with minimized energy consumption. As shown in FIG. 1, an influent 30 of wastewater containing biosolids and ammonia is received into an anoxic tank 20, where the wastewater is mixed with return activated sludge 32a and 32b under substantially anoxic conditions. The return activated sludge includes nitrifying, denitrifying and luxury uptake organisms. The wastewater is received into one or more first aeration tanks 22a and 22b, where the wastewater is sequentially subjected to alternating aerating and non-aerating (i.e., quiescent) conditions. The wastewater from each first aeration tank is then received into a second aeration tank 24a and 24b, where again the wastewater is sequentially subjected to alternating aerating and non-aerating conditions. The quiescent and agitating steps are repeated in order to reduce the levels of nitrates and phosphorous compounds. The wastewater is then clarified in a clarifier 26a and 26b with the clarified effluent 40 being substantially free of nitrogen-based and phosphorous-based nutrients, with the settled sludge 32a and 32b being returned to the anoxic tank. The systems include a controller 80 that efficiently controls the amount of air delivered to various tanks so as to optimize removal of nitrogen-based and phosphorous-based nutrients and minimize energy consumption.

Figure 2:
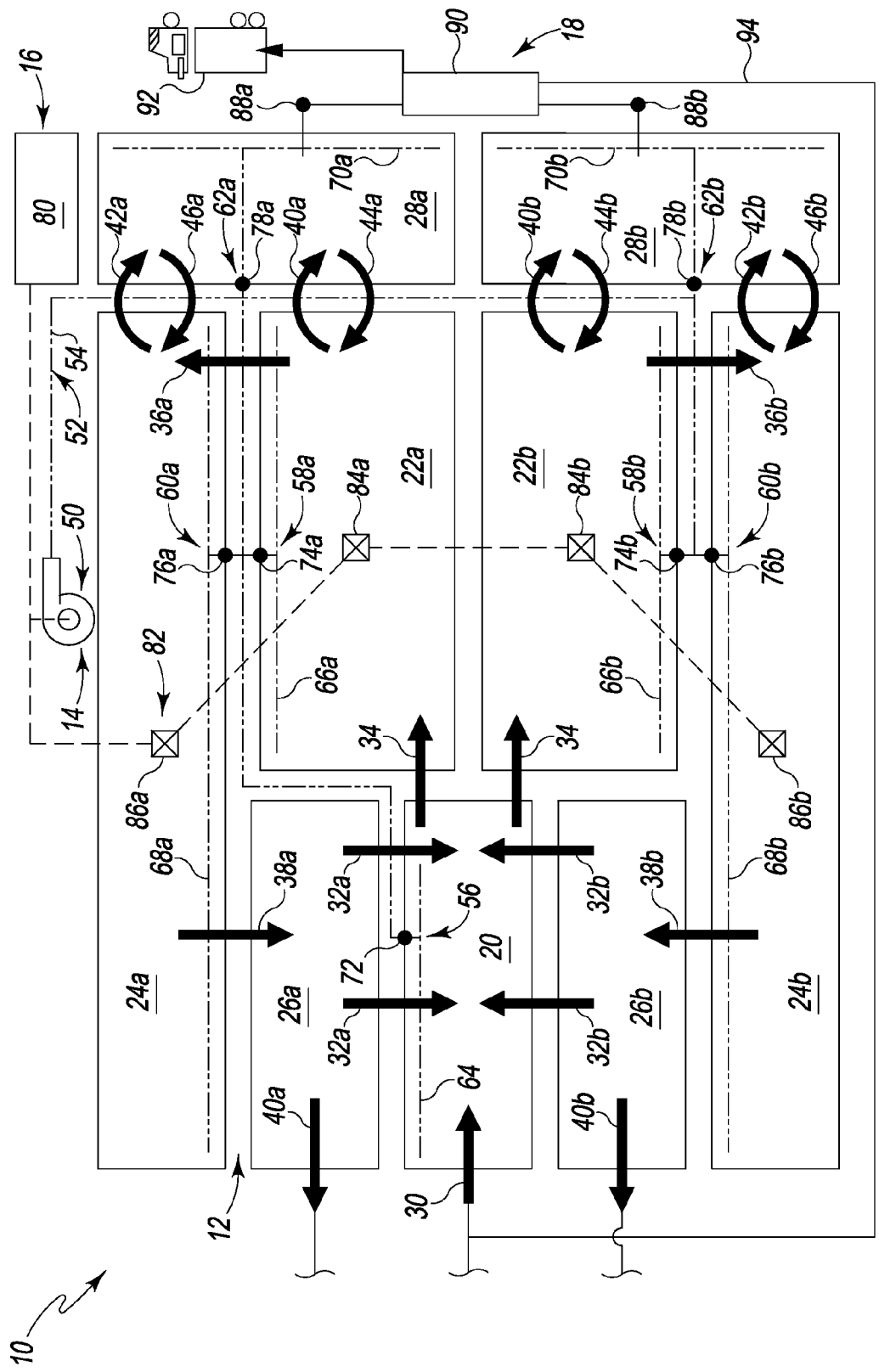
FIG. 2 is a plan view of an exemplary wastewater treatment system, according to aspects of this disclosure.

FIG. 2 is a plan view of an exemplary wastewater treatment system 10, which includes a tank system 12, an air system 14, a control system 16 and a biosolids removal system 18, as discussed below.

I. The Tank System

Tank system 12 defines a plurality of wastewater treatment tanks, which may include, but are not limited to, an anoxic tank 20, first sequential aeration tanks 22a and 22b, second sequential aeration tanks 24a and 24b, clarifiers 26a and 26b, and digesters 28a and 28. The tanks may have generally rectangular shapes with open tops and depths of about 12-20 feet.

Anoxic tank 20 may be configured to receive an influent 30 of wastewater containing biosolids and ammonia, such as raw sewage. For example, the anoxic tank may receive the wastewater through a conduit, such as an inlet pipe positioned just above the water line. The anoxic tank also may be configured to receive return activated sludge 32a and 32b comprising nitrifying, denitrifying and/or luxury uptake microorganisms from one or more other tanks in the wastewater treatment system. For example, the return activated sludge may be pumped or otherwise diverted from clarifiers 26a and 26b to the anoxic tank through conduits, such as notches, pipes and/or troughs. After the influent and return activated sludge has been received by the anoxic tank, air system 14 mixes the return activated sludge with influent under substantially anoxic conditions, as discussed in more detail below.

Each first aeration tank 22a and 22b is configured to receive wastewater 34 from anoxic tank 20. For example, each aeration tank may receive wastewater through a notch or other conduit defined in the top of a wall separating each first aeration tank from the anoxic tank, such that the first aeration tanks receive substantially equal volumes of wastewater. As discussed in more detail below, air system 14 may be used to subject the wastewater in the first aeration tanks 22a and 22b to alternating aerating and non-aerating (e.g., quiescent) conditions in order to reduce the levels of nitrates and phosphorous compounds.

Second aeration tank 24a is configured to receive wastewater 36a from first aeration tank 22a, such as through a notch or other conduit defined in the top of the wall separating first aeration tank 22a from second aeration tank 24a. Likewise, second aeration tank 24b is configured to receive wastewater 36b from first aeration tank 22b, such as through a notch or other conduit defined in the top of the wall separating first aeration tank 22b from second aeration tank 24b. As discussed in more detail below, air system 14 may be used to subject the wastewater received by second aeration tanks 24a and 24b to alternating aerating and non-aerating (e.g., quiescent) conditions in order to further reduce the levels of nitrates and phosphorous compounds.

Clarifier 26a is configured to receive wastewater 38a from second aeration tank 24a. For example, wastewater 38a may be pumped or otherwise diverted from aeration tank 24a to clarifier 26a through conduits, such as notches, pipes, and/or troughs. Clarifier 26b similarly is configured to receive wastewater 38b from second aeration tank 24b. Within clarifiers 26a and 26b, the wastewater is clarified to form clarified effluent 40a and 40b, respectively, which is discharged away from the wastewater treatment system by way of effluent pipes, and is substantially free of nitrogen-based and phosphorous-based nutrients. Each clarifier 26a and 26b includes clarifying equipment operable for separating and decanting the clarified effluent from biosolids for discharge through the effluent pipes, and for returning at least a portion of the biosolids to anoxic tank 20 as return activated sludge 32a and 32b as described above and in U.S. Pat. No. 5,035,795, the entire contents of which are herein incorporated by reference for all purposes.

Digesters 28a and 28b may be used to control the biosolids concentration(s) in the various tanks of wastewater treatment system 10. Specifically, the digesters may be configured to receive and decompose biosolids after which the biosolids are removed from the system for disposal or use. First, the digesters are configured to receive wastewater (i.e., in the form of aerated mixed liquor) containing biosolids (e.g. sludge) from one or more of the other treatment tanks in the wastewater treatment system. For example, digester 28a may be configured to receive aerated mixed liquor 40a from first aeration tank 22a, and/or aerated mixed liquor 42a from second aeration tank 24a, such as with the use of one or more conventional air lift pumps. Digester 28b similarly may be configured to receive aerated mixed liquor 40b from first aeration tank 22b, and/or aerated mixed liquor 42b from second aeration tank 24b. Digesters 28a and 28b also may be configured to receive concentrated sludge from clarifiers 26a and 26b, respectively.

Next, the digesters may be configured to return water containing a lower concentration of biosolids back to the other treatment tanks in the wastewater treatment system. As discussed in more detail below, the wastewater treatment system 10 may be configured to cause the digesters to undergo a quiescent period prior to receiving aerated mixed liquor and/or sludge. During the quiescent period, biosolids present in the wastewater within the digesters settle to the bottom of the tank, forming a clarified supernatant above a bed of sludge. When aerated mixed liquor is thereafter delivered to the digesters from the other tanks within the system, the clarified supernatant flows back from the digesters to one or more other treatment tanks within the system, thereby increasing the overall concentration of biosolids in the digesters and reducing the overall concentration of biosolids in the other treatment tanks. For example, when digesters 28a or 28b receive aerated mixed liquor 40a or 40b from first aeration tanks 22a or 22b, respectively, clarified supernatant 44a or 44b may be displaced from digesters 28a or 28b back into aeration tanks 22a, 22b, 24a or 24b, respectively, such as through notches in the walls between the aeration tanks and the digesters. Similarly, when digesters 28a or 28b receive aerated mixed liquor 42a or 42b from second aeration tanks 24a or 24b, respectively, clarified supernatant 46a or 46b may be displaced from digesters 28a or 28b back into aeration tanks 22a, 22b, 24a or 24b, respectively, such as through notches in the walls between the aeration tanks and the digesters After delivering biosolids to digesters 28a and 28b, the biosolids may be digested with microorganisms under oxic, anoxic and/or anaerobic conditions, and then removed from the wastewater treatment system for disposal and/or use. As discussed in more detail below, air system 14 may be used to subject the wastewater received by the digesters to alternating oxic, anoxic and/or anaerobic conditions, as desired to facilitate microbial digestion of the biosolids to a substantially less toxic or usable form. Biosolids removal system 18 then may be used to remove the biosolids from the system.

II. The Air System

Air system 14 may include a blower assembly 50 coupled to a piping system 52. Blower assembly 50 may include a plurality of blowers, including, but not limited to, a lead blower and one or more lag or auxiliary blowers for supplying air in selected amounts to the piping system. The blowers may be electrically and/or mechanically coupled to control system 16 for controlling the amount of air supplied by the blowers (i.e., by selectively controlling the frequency or flow rate of the plurality of blowers and the number of blowers supplying air).

Piping system 52 may include supply pipes 54, and a plurality of aeration systems, where each aeration system is configured to selectively deliver air from the supply pipes to at least one corresponding tank in the tank system 12. For example, the plurality of aeration systems may include, but are not limited to, aeration system 56 for selectively delivering air to anoxic tank 20, aeration systems 58a and 58b for selectively delivering air to first aeration tanks 22a and 22b, respectively, aeration systems 60a and 60b for selectively delivering air to second aeration tanks 24a and 24b, respectively, and/or aeration systems 62a and 62b for selectively delivering air to digesters 28a and 28b, respectively.

Each aeration system may include a pipe run and/or one or more valves for controlling the delivery of air from the supply pipes to the pipe run. For example, aeration system 56 may include pipe run 64, aeration systems 58a and 58b may include pipe runs 66a and 66b, respectively, aeration system 60a and 60b may include pipe runs 68a and 68b, respectively, and aeration systems 62a and 62b may include pipe runs 70a and 70b, respectively. Likewise, aeration system 56 may include valve 72, aeration systems 58a and 58b may include valves 74a and 74b, respectively, aeration system 60a and 60b may include valves 76a and 76b, respectively, and aeration systems 62a and 62b may include valves 78a and 78b, respectively. Each pipe run may include one or more sparging aerators (also referred to as agitators) that are positioned within the corresponding tank (e.g., on the sides and/or bottom of the tank) and receive air from aerator pipes attached to the corresponding valve. Each valve may be coupled to and selectively controlled by the control system 16, as described below. Each valve also may be manually controllable.

It should be appreciated that the amount of air delivered to any particular aerator (and thus its corresponding tank) is dependent on the amount of air passing through each valve 72, 74a, 74b, 76a, 76b, 78a, and 78b, which in turn Is dependent on the total amount of air supplied by the blower assembly 50. As discussed below, the control system may be used to control both the valves and the blower assembly in a manner that optimizes biological treatment of the wastewater and minimizes energy usage.

It also should be appreciated that, even though aeration system 56 uses air to agitate the contents of anoxic tank 20, aeration system 56 may be configured so that the amount of air discharged into anoxic tank 20 is low enough to accomplish mixing without altering the anoxic environment therein, such as is described in U.S. Pat. No. 5,421,383, which is hereby incorporated by reference in its entirety for all purposes.

III. The Control System

The control system 16 may include a controller 80 and a sensor assembly 82 comprising one or more sensors for periodically measuring values corresponding to the amount of dissolved oxygen in at least one aeration tank. The controller may be coupled to blower assembly 50, to one or more of the air system valves 72, 74a, 74b, 76a, 76b, 78a, and 78b, and/or to sensor assembly 82. The controller may be used to selectively control the total amount of air supplied by the blower assembly 80 (such as by controlling the frequency or flow rate of each individual blower within the blower assembly, and/or by controlling the number of blowers supplying air), as well the various valves to which it is coupled. The controller also may be configured to receive information from the sensor assembly corresponding to the amount of dissolved oxygen in one or more of the aeration tanks, and to respond to those signals by adjusting the operating parameters of the blower assembly 50 and/or valves 72, 74a, 74b, 76a, 76b, 78a, and 78b.

Controller 80 may be configured to operate in a plurality of modes, where at least some of the modes optimize microbial processing of the wastewater, and minimize the energy consumption of the wastewater treatment system. Specifically, the controller may be programmed with a control program that automatically or manually switches the controller between its various modes. In each mode, the controller may be configured to provide a control commands to each of valves 72, 74a, 74b, 76a, 76b, 78a, and 78b and/or blower assembly 50 in order to control the amount of air delivered to each of the treatment tanks. For example, in some modes, the controller may cause the blower assembly to be turned off, such that none of the treatment tanks receive air, whereas for other modes the controller may cause the blower assembly to be turned on, thereby delivering air through piping system 52. In modes where the blower assembly is on, the controller may selectively open and/or close valves 72, 74a, 74b, 76a, 76b, 78a, and 78b as desired, and may selectively control the total amount of air supplied by the blower assembly 50 (such as by controlling the frequency or flow rate of each individual blower within the blower assembly, and/or by controlling the total number of blowers supplying air) in order to selectively provide the optimal amount of air to each of the various processing tanks in system 10. Table 1 below illustrates various exemplary modes of operation for controller 80, and the various tanks that either do not receive any air (NA), that receive air sufficient for agitation only (Ag Anoxic) or that receive air sufficient to maintain aerating conditions (A). The modes shown in Table 1 are exemplary only, and other modes are contemplated by this disclosure.

TABLE 1

| Mode | Blowers 50 | Tank 20 | Tank 22a | Tank 22b | Tank 24a | Tank 24b | Tank 28a | Tank 28b |
|---|---|---|---|---|---|---|---|---|
| 1 | OFF | NA | NA | NA | NA | NA | NA | NA |
| 2 | ON | Ag Anoxic | A | A | A | NA | A | A |
| 3 | ON | Ag Anoxic | A | A | A | NA | A | NA |
| 4 | ON | Ag Anoxic | A | A | A | NA | NA | A |
| 5 | ON | Ag Anoxic | A | A | A | NA | NA | NA |
| 6 | ON | Ag Anoxic | A | A | NA | A | A | A |
| 7 | ON | Ag Anoxic | A | A | NA | A | A | NA |
| 8 | ON | Ag Anoxic | A | A | NA | A | NA | A |
| 9 | ON | Ag Anoxic | A | A | NA | A | NA | NA |
| 10 | ON | Ag Anoxic | A | NA | A | NA | A | A |
| 11 | ON | Ag Anoxic | A | NA | A | NA | A | NA |
| 12 | ON | Ag Anoxic | A | NA | A | NA | NA | A |
| 13 | ON | Ag Anoxic | A | NA | A | NA | NA | NA |
| 14 | ON | Ag Anoxic | A | NA | NA | A | A | A |
| 15 | ON | Ag Anoxic | A | NA | NA | A | A | NA |
| 16 | ON | Ag Anoxic | A | NA | NA | A | NA | A |
| 17 | ON | Ag Anoxic | A | NA | NA | A | NA | NA |
| 18 | ON | Ag Anoxic | NA | A | A | NA | A | A |
| 19 | ON | Ag Anoxic | NA | A | A | NA | A | NA |
| 20 | ON | Ag Anoxic | NA | A | A | NA | NA | A |
| 21 | ON | Ag Anoxic | NA | A | A | NA | NA | NA |
| 22 | ON | Ag Anoxic | NA | A | NA | A | A | A |
| 23 | ON | Ag Anoxic | NA | A | NA | A | A | NA |
| 24 | ON | Ag Anoxic | NA | A | NA | A | NA | A |
| 25 | ON | Ag Anoxic | NA | A | NA | A | NA | NA |

As can be seen in Table 1, for each mode of operation, the blower assembly 50 delivers air to a particular number of tanks, and within each tank, oxygen is consumed by the microorganisms in the wastewater as they consume biosolids during normal metabolism. As such, for each mode of operation, the wastewater treatment system 10 creates an overall demand for air and/or oxygen that is dependent on the number and volume of the tanks receiving air, the amount of biosolids within the various tanks, and the rate of microbial consumption of dissolved oxygen within the various tanks. Although this overall demand may fluctuate due to the relative amounts of biosolids and the rate of microbial oxygen consumption, the expected demand for any particular operating mode generally can be estimated or extrapolated based on known and/or expected performance of any particular system 10. The controller may be configured to cause the blower assembly 50 to provide a preselected amount of air for each mode. For any particular operating mode, the preselected amount of air may be based, at least in part, on the expected oxygen demand, and either may be static or may fluctuate with time to optimize concentrations of dissolved oxygen for microbial processing and/or to minimize energy consumption. As discussed in more detail below, the amount of air delivered by the blowers may be adjusted based on dissolved oxygen concentrations as measured by sensor assembly 82.

For any particular operating mode, some tanks may be required to receive at least a minimum amount of air to prevent biosolids from settling and to maintain the biosolids in suspension. As such, the controller may be configured to ensure that the blower assembly operates at or above a preselected low operating threshold so as to deliver sufficient air to agitate biosolids in each tank receiving air from the blower assembly. Because the number of tanks receiving air is dependent on the operating mode of the controller, the preselected low operating threshold of the blower assembly also is dependent on the operating mode of the controller.

Barring manual intervention by an operator, controller 80 may be programmed to automatically cycle through and between various modes in a substantially predetermined pattern that has been determined to optimize microbial processing of the wastewater and minimize energy consumption. Exemplary processing times and conditions for sequential aerating and nonaerating steps are describe in detail in U.S. Pat. No. 5,611,927, the entire content of which is herein incorporated by reference in its entirety. The present system and methods may dramatically minimize energy consumption by cycling through modes that cause the fewest total number of first aeration tanks (22a and 22b) and second aeration tanks (24a and 24b) tanks to receive air while still providing sufficient aeration to each tank to ensure proper microbial processing of the wastewater. For example, the controller may be configured to operate in a first mode for a designated period of time that causes blower assembly 50 to deliver air to first aeration tank 22a but not to second aeration tank 24a, and then in a second mode for a designated period of time that causes the blower assembly to deliver air to second aeration tank 24a but not first aeration tank 22a. When the controller is in the first mode, the controller also may cause the blower assembly to deliver air to first aeration tank 22b but not to second aeration tank 24b, and when the controller is in the second mode, the controller may cause the blower assembly to deliver air to second aeration tank 24b but not to first aeration tank 22b. Alternatively, when the controller is in the first mode, the controller may cause the blower assembly to deliver air to second aeration tank 24b but not to first aeration tank 22b, and when the controller is in the second mode, the controller may cause the blower assembly to deliver air to first aeration tank 22b but not to second aeration tank 24b. In either case, the system only delivers air to two tanks at any period of time, thus reducing overall energy consumption while still being able to provide sufficient aeration to each of the four or more tanks to ensure proper microbial processing of the wastewater.

As discussed above, the amount of air delivered by the blower assembly 50 in any particular mode may be adjusted based on dissolved oxygen concentrations as measured by sensor assembly 82. The sensor assembly may include one or more sensors for periodically measuring values corresponding to the amount of dissolved oxygen in at least one aeration tank. For example, the sensor assembly may include sensors 84a and 84b for measuring the dissolved oxygen in each of the first aeration tanks 22a and 22b, respectively, and sensors 86a and 86b for measuring the dissolved oxygen in each of the second aeration tanks 24a and 24b, respectively. Although sensors have only been shown in tanks 22a, 22b, 24a and 24b, it should be appreciated that any tank may have a sensor to affect control over the amount of air provided by the blower assembly 50. Moreover, a particular tank may include a plurality of sensors. During any particular mode, the value measured by the sensor assembly may be the dissolved oxygen concentration measured by one of the sensors or may be an aggregate or average value calculated from the dissolved oxygen concentrations measured by a plurality of sensors. As indicated above, the sensor assembly may be coupled to controller 80 and may send signals to the controller corresponding to the dissolved oxygen measured by the sensor assembly. In order to minimize energy consumption, controller 80 may receive the signals, and respond thereto by adjusting the operating parameters of the blower assembly 50 and/or valves 72, 74a, 74b, 76a, 76b, 78a, and 78b in order to provide the least oxygen necessary for efficient microbial processing.

Some wastewater treatment systems may include a controller 80 and a sensor assembly 82 configured to selectively maintain the concentration of dissolved oxygen in one or more of the aeration tanks within a range corresponding to an optimal high setpoint value and an optimal low setpoint value. The low and high setpoint values may correspond to dissolved oxygen concentrations for optimal nitrification. For example, the low setpoint value may correspond to a dissolved oxygen concentration between about 0.1 mg/mL and about 4.0 mg/mL, depending on a particular installation and/or application, such as a dissolved oxygen concentration of about 0.1 mg/mL, about 0.2 mg/mL, about 0.3 mg/mL, about 0.4 mg/mL, about 0.5 mg/mL, about 0.6 mg/mL about 0.7 mg/mL about 0.8 mg/mL about 0.9 mg/mL, about 1.0 mg/mL, about 1.5 mg/mL, about 2.0 mg/mL, about 2.5 mg/mL, about 3.0 mg/mL, about 3.5 mg/mL, or about 4.0 mg/mL. The high setpoint value may correspond to a dissolved oxygen concentration between about 0.5 mg/mL and about 5.0 mg/mL, depending on a particular installation and/or application, such as a dissolved oxygen concentration of about 0.5 mg/mL, about 0.6 mg/mL about 0.7 mg/mL about 0.8 mg/mL about 0.9 mg/mL, about 1.0 mg/mL, about 1.5 mg/mL, about 2.0 mg/mL, about 2.5 mg/mL, about 3.0 mg/mL, about 3.5 mg/mL, about 4.0 mg/mL, about 4.5 mg/mL, or about 5.0 mg/mL.

Figure 3:
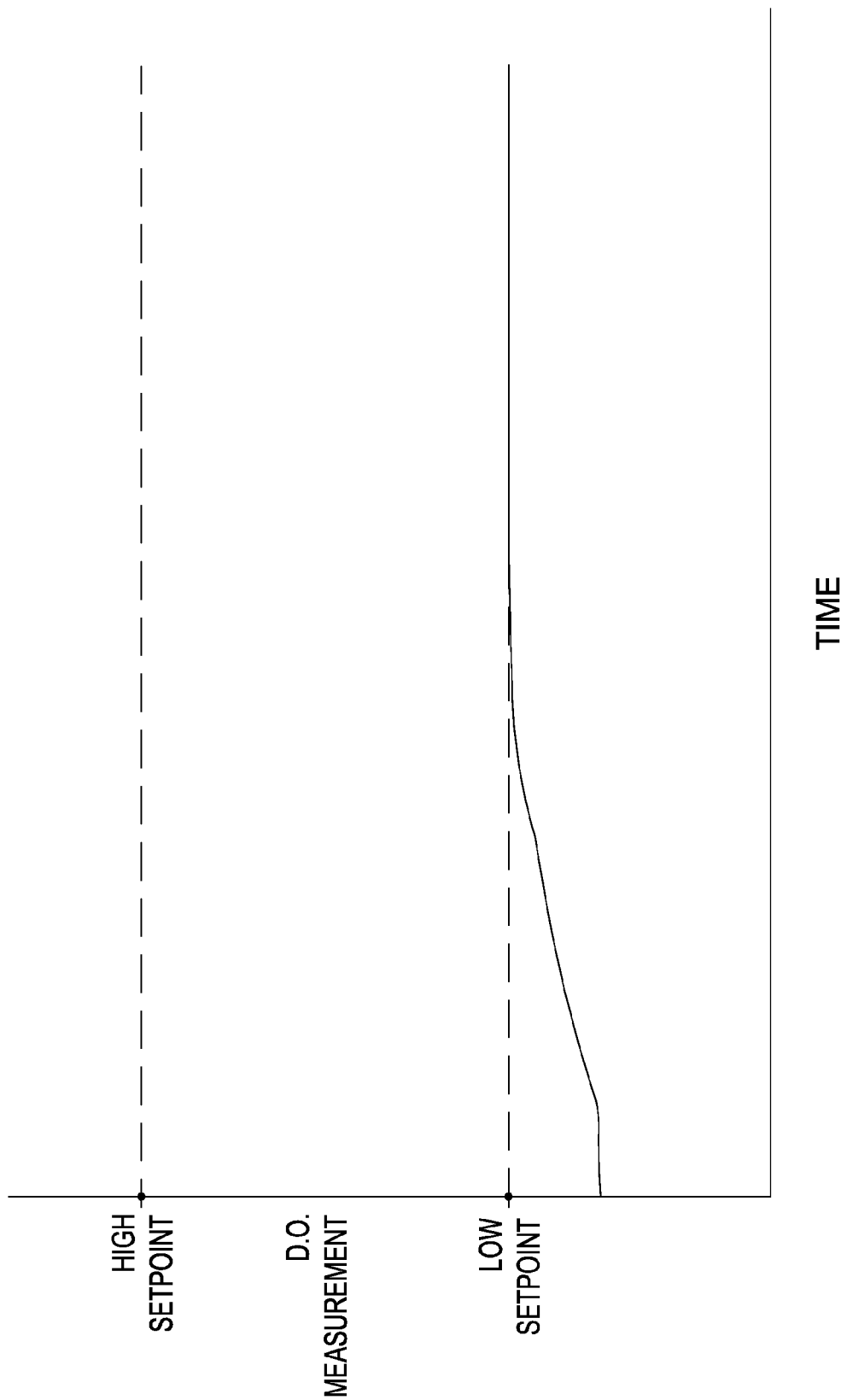
FIG. 3 is a graph showing dissolved oxygen (D.O.), as measured and controlled by a wastewater treatment system of this disclosure, as a function of time.
Figure 4:
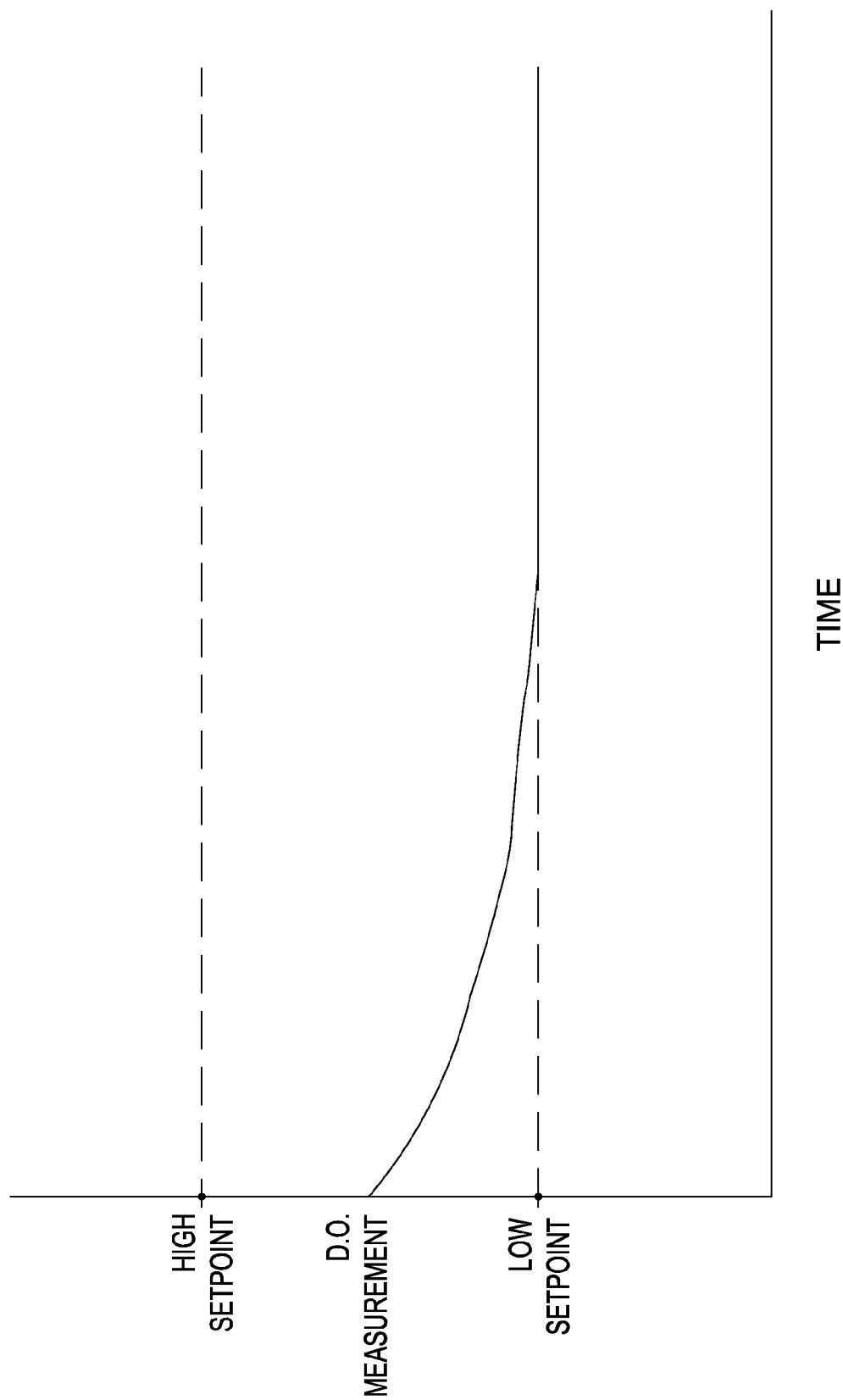
FIG. 4 is another graph showing dissolved oxygen (D.O.), as measured and controlled by a wastewater treatment system of this disclosure, as a function of time.
Figure 5:
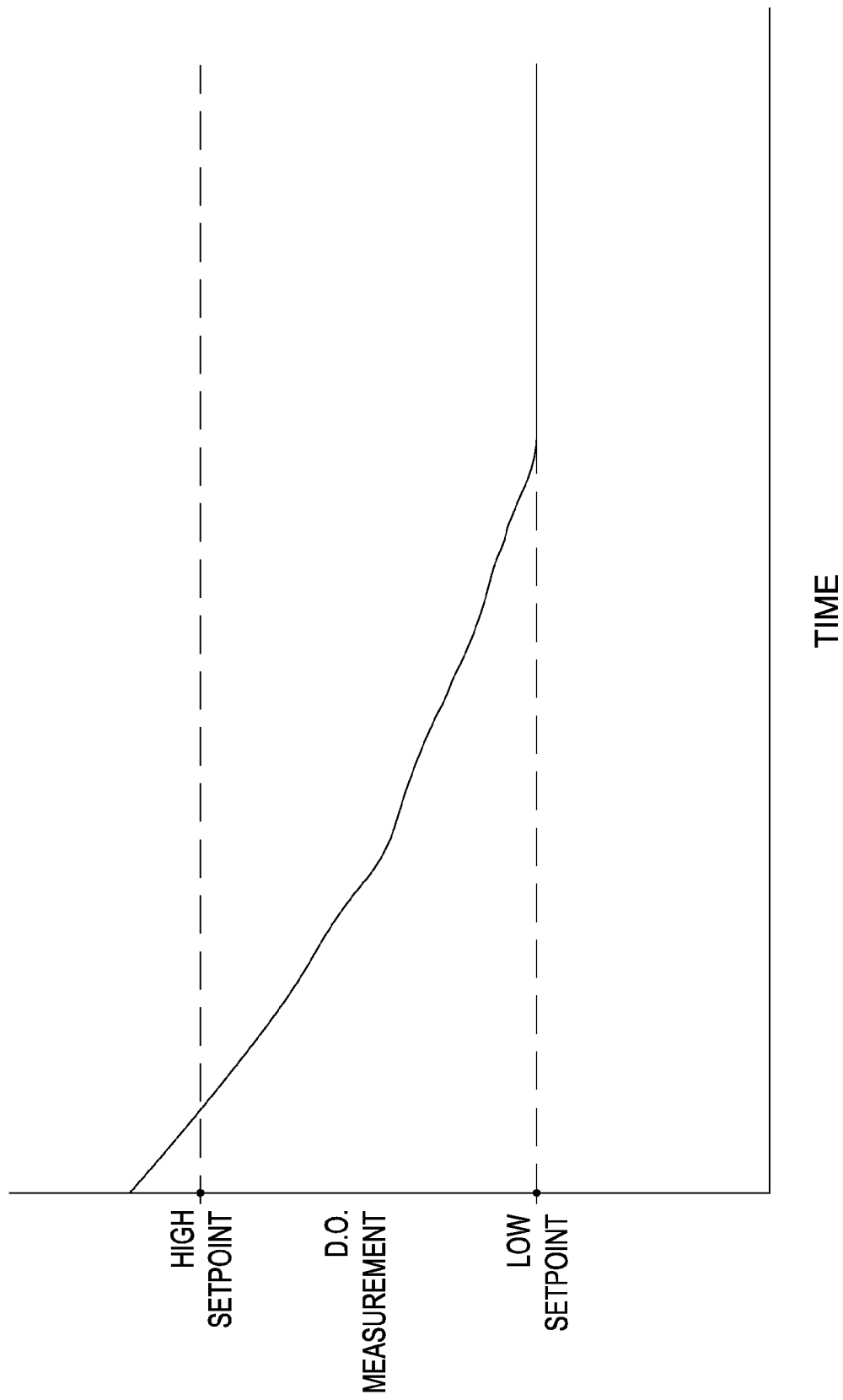
FIG. 5 is another graph showing dissolved oxygen (D.O.), as measured and controlled by a wastewater treatment system of this disclosure, as a function of time.
Figure 6:
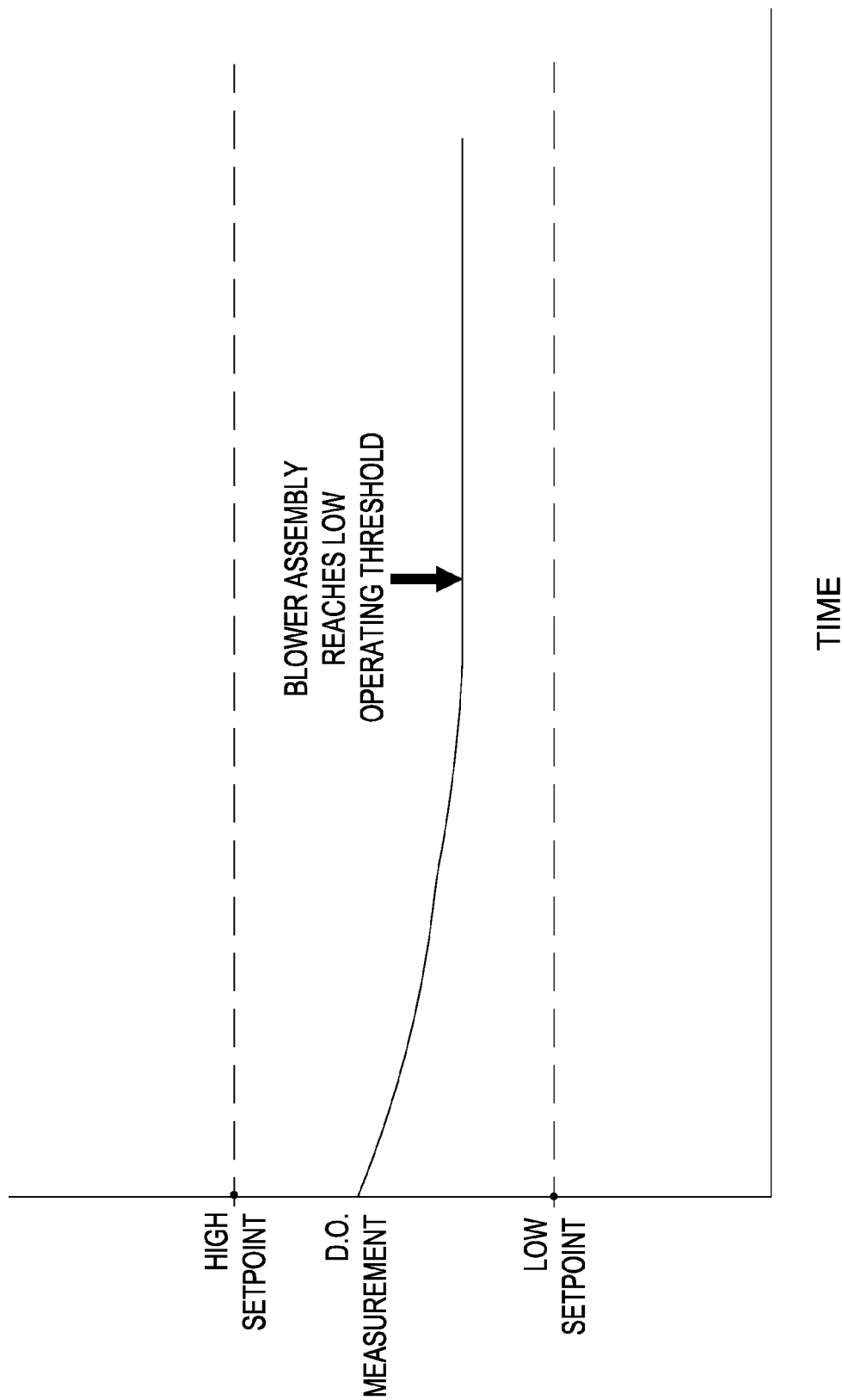
FIG. 6 is another graph showing dissolved oxygen (D.O.), as measured and controlled by a wastewater treatment system of this disclosure, as a function of time.
Figure 7:
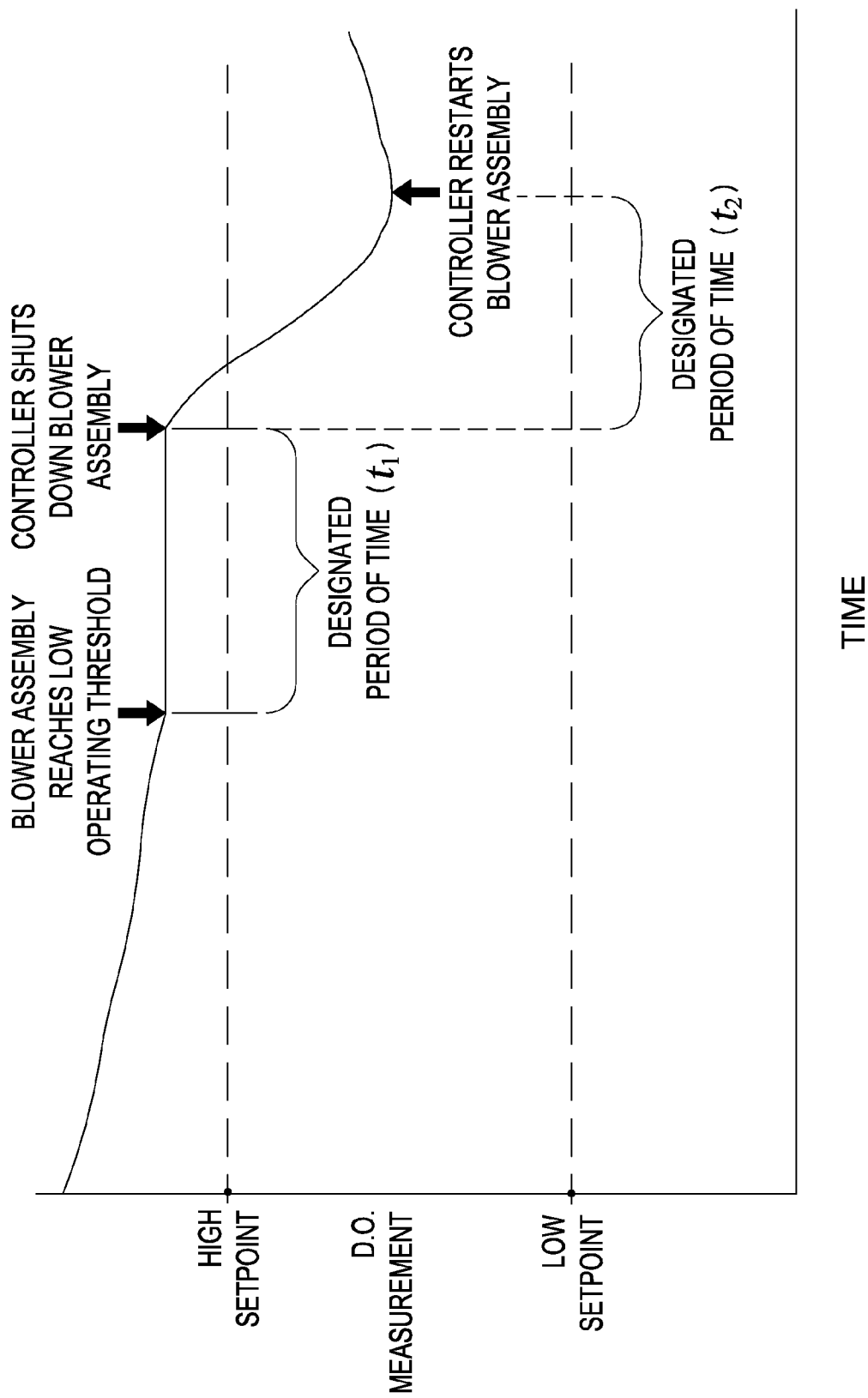
FIG. 7 is another graph showing dissolved oxygen (D.O.), as measured and controlled by a wastewater treatment system of this disclosure, as a function of time.

The low and high setpoint values may be used to dramatically reduce the energy consumption of the system. As shown in FIG. 3, when the sensor assembly measures values that are less than the low setpoint value, the controller may cause the blower assembly to incrementally deliver more air until the sensor assembly measures values that are not less than the low setpoint value. For example, the controller may cause the blower assembly to ramp up about 1 Hz every 1-5 minutes (or any other selected period) until the sensor assembly measures a value corresponding to a dissolved oxygen concentration of about 0.1 mg/L in at least one aeration tank. As shown in FIGS. 4-6, when the sensor assembly measures values that exceed the low setpoint value, the controller may cause the blower assembly to incrementally deliver less air until either the sensor assembly measures values that are not greater than the low setpoint value (FIGS. 4 and 5), or the blower assembly reaches a preselected low operating threshold (FIG. 6). For example, the controller may cause the blower assembly to ramp down about 1 Hz every 5-20 minutes until the sensor assembly measures a value corresponding to a dissolved oxygen concentration of about 0.1 mg/L in at least one aeration tank, or the blower assembly reaches a lower limit where only a single lead blower is operating at a level necessary to keep biosolids in suspension. As shown in FIG. 7, when the blower assembly is operating at the preselected low operating threshold, and the sensor assembly measures values that exceed a high setpoint value for a first designated period of time, the controller may cause the blower assembly to shut down for a second designated period of time, and then re-start the blower assembly at the low operating threshold. It should be appreciated that the preselected low operating threshold for the blower assembly may correspond to the minimum amount of air that must be delivered by the blower assembly to agitate biosolids in each tank receiving air from the blower assembly and, as discussed above, may be dependent on the operating mode of the controller. It also should be appreciated that the controller may adjust the rate of the blower assembly any desired amount and at any desired periodic rate.

IV. The Biosolids Removal System

Wastewater containing a high concentration of biosolids may be removed from digesters 28a and 28b with any suitable disposal equipment. For example, sludge may be pumped from digesters 28a and 28b with sludge feed pumps 88a and 88b, respectively, to a belt press 90, which dewaters the biosolids for loading onto a truck 92 or other transport. The water 94 liberated from the biosolids by the belt press may be combined with influent for further processing. The treated and dewatered biosolids may then be disposed of or used for fertilizer.

It is to be understood that the inventions provided herein are not limited to the specific details of construction and arrangement of components set forth in the present description. The invention is capable of other embodiments and of being practiced or of being carried out in various ways. Also it is to be understood that the phraseology and terminology used herein is for the purpose of description only, and should not be regarded as limiting. Ordinal indicators, such as first, second, and third, as used in the description and the claims to refer to various structures, are not meant to be construed to indicate any specific structures, or any particular order or configuration to such structures. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification, and no structures shown in the drawings, should be construed as indicating that any non-claimed element is essential to the practice of the invention.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

Further, no admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinency of any of the documents cited herein.

What is claimed:

1. A wastewater treatment system comprising:
one or more aeration tanks for receiving wastewater;
a controller for controlling the amount of air delivered to each of the one or more aeration tanks by a blower assembly; and
a sensor assembly for periodically measuring values corresponding to the amount of dissolved oxygen in at least one of the one or more aeration tanks, wherein:
when the sensor assembly measures values that are less than a low setpoint value, the controller causes the blower assembly to incrementally deliver more air until the sensor assembly measures values that are not less than the low setpoint value;

when the sensor assembly measures values that exceed the low setpoint value, the controller causes the blower assembly to incrementally deliver less air until either the sensor assembly measures values that are not greater than the low setpoint value, or the blower assembly reaches a preselected low operating threshold; and when the blower assembly is operating at the preselected low operating threshold, and the sensor assembly measures values that exceed a high setpoint value for a first designated period of time, the controller causes the blower assembly to shut down for a second designated period of time.

2. The wastewater treatment system of claim 1, wherein the low setpoint value corresponds to a dissolved oxygen concentration in at least one aeration tank that is between about 0.1 mg/L and about 4.0 mg/mL.

3. The wastewater treatment system of claim 1, wherein the high setpoint value corresponds to a dissolved oxygen concentration in at least one aeration tank that is between about 0.5 mg/mL and about 5.0 mg/mL.

4. The wastewater treatment system of claim 1, wherein when the blower assembly is operating at the preselected low operating threshold, the blower assembly delivers sufficient air to agitate biosolids in each tank receiving air from the blower assembly.

5. The wastewater treatment system of claim 1, wherein the preselected low operating threshold is dependent on the operating mode of the controller.

6. The wastewater treatment system of claim 1, wherein the one or more aeration tanks include a first aeration tank adapted to receive wastewater, and a second aeration tank adapted to receive wastewater from the first aeration tank, and wherein the controller operates in a plurality of modes including a first mode that causes the blower assembly to deliver air to the first aeration tank but not to the second aeration tank, and a second mode that causes the blower assembly to deliver air to the second aeration tank but not to the first aeration tank.

7. The wastewater treatment system of claim 6, further comprising an anoxic tank for receiving an influent of wastewater containing biosolids and ammonia, wherein the first aeration tank is adapted to receive wastewater from the anoxic tank.

8. The wastewater treatment system of claim 7, further comprising:
a third aeration tank adapted to receive wastewater from the anoxic tank; and
a fourth aeration tank adapted to receive wastewater from the third aeration tank.

9. The wastewater treatment system of claim 8, wherein when the controller is in the first mode, the controller causes the blower assembly to deliver air to the third aeration tank but not to the fourth aeration tank, and when the controller is in the second mode, the controller causes the blower assembly to deliver air to the fourth aeration tank but not to the third aeration tank.

10. The wastewater treatment system of claim 8, wherein when the controller is in the first mode, the controller causes the blower assembly to deliver air to the fourth aeration tank but not to the third aeration tank, and when the controller is in the second mode, the controller causes the blower assembly to deliver air to the third aeration tank but not to the fourth aeration tank.

11. A method of treating wastewater, the method comprising:
receiving an influent of wastewater;
aerating the wastewater while periodically measuring values corresponding to the amount of dissolved oxygen in the wastewater;
when the measured value is less than a designated lower limit, incrementally increasing the amount of aeration until the measured value is not less than the lower limit;
when the measured value is greater than the lower limit, incrementally decreasing the amount of aeration until either the measured value is not greater than the lower limit or a designated low aerating threshold has been reached; and
when the designated low aerating threshold has been reached, and the measured value is greater than a designated upper limit for a first designated period of time, terminating aerating for a designated period of time.

12. The method of claim 11, wherein the lower limit corresponds to an amount of dissolved oxygen between about 0.1 mg/L and about 4.0 mg/mL.

13. The method of claim 11, wherein the upper limit corresponds to an amount of dissolved oxygen between about 0.5 mg/L and about 5.0 mg/mL.

14. The method of claim 11, wherein a blower assembly is used to aerate the wastewater.

15. The method of claim 14, wherein the designated low aerating threshold has been reached when the blower assembly is operating at a preselected low operating threshold, and wherein when the blower assembly is operating at the preselected low operating threshold, the blower assembly is delivering sufficient air to agitate biosolids in each tank receiving air from the blower assembly.

16. The method of claim 11, wherein the preselected low operating threshold is dependent on the operating mode of the controller.

17. The method of claim 11, comprising receiving wastewater in a first aeration tank, and receiving wastewater in a second aeration tank from the first aeration tank, wherein the step of aerating the wastewater comprises aerating the wastewater in the first aeration tank while not aerating the wastewater in the second aeration tank, and aerating the wastewater in the second aeration tank while not aerating the wastewater in the first aeration tank.

18. The method of claim 17, wherein a blower assembly is used to aerate the wastewater.

19. The method of claim 17, wherein the influent of wastewater is received into an anoxic tank, and wherein the step of receiving wastewater in the first aeration tank comprises receiving wastewater in the first aeration tank from the anoxic tank.

20. The method of claim 19, further comprising:
receiving wastewater in a third aeration tank from the anoxic tank; and
receiving wastewater in a fourth aeration tank from the third aeration tank.

21. The method of claim 20, further comprising either aerating the wastewater in the first and third aeration while not aerating the wastewater in the second and fourth aeration tanks, or aerating the wastewater in the first and fourth aeration tanks while not aerating the wastewater in the second and third aeration tanks.

* * * * *